M. PERIN & O. P. CALLAWAY.
Improvement in Reamers for Rock-Drills and Oil-Wells.
No. 128,747. Patented July 9, 1872.

WITNESSES.
Jas. L. Ewin
Walter Allen

INVENTORS.
Moses Perin
O. P. Callaway
By Knight Bro
Attorney

UNITED STATES PATENT OFFICE.

MOSES PERIN AND OLIVER P. CALLAWAY, OF SAN DIEGO, CALIFORNIA.

IMPROVEMENT IN REAMERS FOR ROCK-DRILLS AND OIL-WELLS.

Specification forming part of Letters Patent No. 128,747, dated July 9, 1872.

Specification describing an Improved Reamer, invented by MOSES PERIN and OLIVER PERRY CALLAWAY, of San Diego, in the county of San Diego, California.

The subject matter of our invention is a reamer, so constructed with cutters or bits—opened by the pressure of water, and closed automatically—that it may be operated at any depth, to enlarge the size of a shaft, through rock or other formation, particularly to facilitate and allow the sinking of a casing-pipe or well-tubing.

Figure 1:
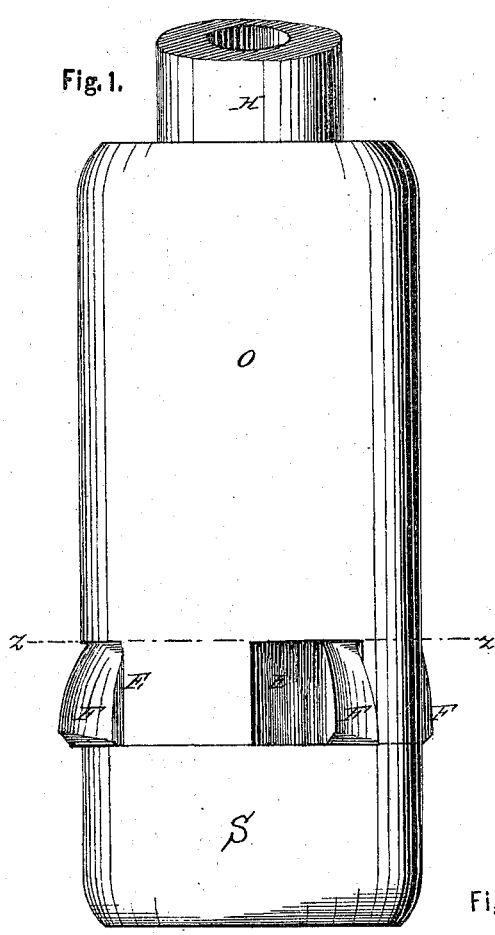
Figure 2:
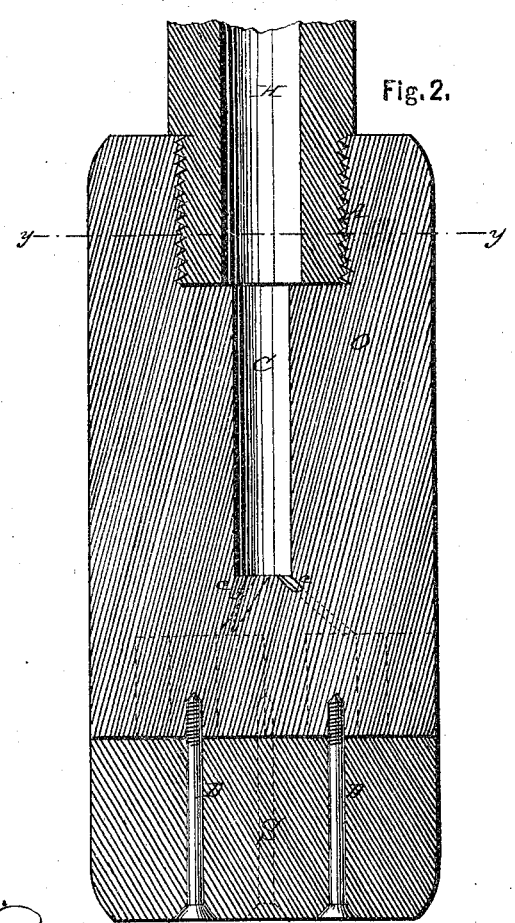
Figure 3:
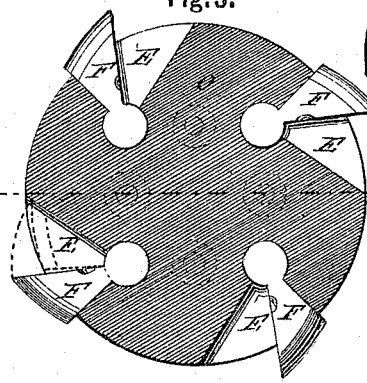
Figure 5:
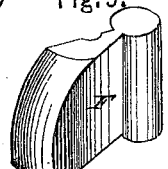
Figure 4:
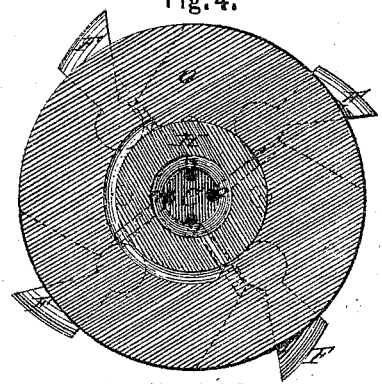

Figure 1 is an elevation of the reamer in working condition. Fig. 2 is a central vertical section of the same. Fig. 3 is a horizontal section in the plane of the cutters on the line $z\ z$, Fig. 1. Fig. 4 is a horizontal section on the line $y\ y$, Fig. 1. Fig. 5 is a perspective of a cutter or bit detached.

The head or stock of the reamer is made of wrought-iron, and consists of a cutter-holder, O, with ducts C $c$ for conducting the water-column of the drill-shaft against the cutters or bits F, to open the same, and to clear out the dirt; and cavities E in its lower edge to receive the cutters, and a cap, S, to cover the end of the holder O and secure the cutters in place. These parts are connected together by screws D, and the whole is attached to the tubular drill-rod H by screw A. The cutters F are made of steel or hardened composition, and are held within the reamer-head by hinge or knuckle joint, and opened by the pressure of water in the drill-shaft, as before stated. Their cutting-edges slope obliquely out and down from the top, so that by raising the drill-shaft and bringing the top of the cutters against the casing-tube, or by giving a slight reverse rotary motion, the cutters are shut into their cavities E within the circumference of the reamer, and its removal thus made easy.

The cutters admit of modified and varied shapes, and may present thick edges for the insertion of diamonds.

We claim as our invention—

1. The cutter-holder O and cap S, constructed and united substantially as shown.
2. A reamer-head containing ducts $c\ c\ c$, by which the pressure of the water-column in the drill-shaft opens the cutters.
3. The cutters, opened by the pressure of water, substantially as herein described.
4. Tangential pivoted cutters or bits, opening horizontally, and constructed with sloping cutting-edges, so as to be closed automatically in the act of withdrawing the reamer, as herein shown and described.
5. The improved reamer, composed of the head O S, with recesses E and ducts C $c$, and the cutters or bits F pivoted in said cavities, substantially as and for the purpose herein shown and described.

San Diego, California, January 30, 1872.

MOSES PERIN.
OLIVER PERRY CALLAWAY.

Witnesses:
G. N. HITCHCOCK,
F. S. LAWRENCE.